United States Patent [19]
Yen et al.

[11] 3,755,218
[45] Aug. 28, 1973

[54] IONICALLY BONDED BLOCK ELASTOMERIC COPOLYMERS OF A POLYQUATERNARY POLYURETHANE AND HEPARIN

[75] Inventors: Shiao-Ping Siao Yen; Alan Rembaum, both of Altadena, Calif.

[73] Assignee: California Institute of Technology, Pasadena, Calif.

[22] Filed: Aug. 14, 1970

[21] Appl. No.: 63,722

[52] U.S. Cl.......... 260/9, 117/138.8 E, 260/77.5 Q, 260/77.5 AS, 424/183
[51] Int. Cl. ..................... A61k 17/18, C08b 25/00
[58] Field of Search................ 260/77.5 Q, 77.5 AS, 260/9, 858, 859; 424/78, 83, 183; 117/138.8 E, 62.1

[56] References Cited
UNITED STATES PATENTS

| | | | |
|---|---|---|---|
| 3,457,098 | 7/1969 | Leininger et al..................... | 424/183 |
| 3,453,194 | 7/1969 | Bennett et al. ...................... | 424/183 |

OTHER PUBLICATIONS

Chem. Abst. 73:7193f, Rembaum et al., "Synthesis—Elastomers".

Rubber Chemistry and Technology, Vol. 39, 1966, pp. 1288-1292, FALB et al., "Elastomers in the Human Body".

Battelle Memorial Institute, PB 168861, June 29, 1965, Published Mar. 10, 1966, FALB et al., "Development of Blood–Compatible Polymeric Materials" pp.(col.) 1–11.

Primary Examiner—William H. Short
Assistant Examiner—Edward Woodberry
Attorney—Lindenberg, Freilich and Wasserman

[57] ABSTRACT

A neutral elastomer is prepared by the urethane linking reaction of diisocyanates with tertiary amino diols. The neutral elastomer is quaternized and is then reacted with an anionic polymer such as heparin to form ionically bonded block elastomeric copolymers. The heparin copolymer has non-thrombogenic characteristics. It can be dissolved in solvents and utilized to form a non-clotting coat on the blood lines in kidney machines.

12 Claims, 2 Drawing Figures

INVENTORS.
SHIAO-PING SIAO YEN
ALAN (NMI) REMBAUM

IONICALLY BONDED BLOCK ELASTOMERIC COPOLYMERS OF A POLYQUATERNARY POLYURETHANE AND HEPARIN

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. FIeld of the Invention:

The present invention relates to cationic elastomeric polymers and block polymers thereof with an anionic macromolecular material such as heparin.

2. Description of the Prior Art:

Several classes of polyelectrolytes have recently been synthesized in work related to preparation of semi-conducting polymers. Polyelectrolytes known as "ionenes" were disclosed in application Ser. No. 678,501 now abandoned. The ionenes were prepared by linking reactions of organo dihalides with ditertiary amines to form essentially linear polymers containing the quaternary nitrogen atom within the polymer chain. Linear polymers of widely varying properties were obtained.

Cationic viscoelastic linear ionene polymers were disclosed in application Ser. No. 825,489, filed May 19, 1969, now U.S. Pat. No. 3,655,814, issued on Apr. 11, 1972. These polymers were prepared by linking reactions between monomeric starting materials, preferably of prepolymer magnitude containing quaternary nitrogen forming coreactants and condensation residue forming coreactants, preferably urethane forming moieties.

It has been found that the quaternary center within the chain of these linear ionenes is excessively sterically hindered and forms weak complexes with anionic materials. Solvation of the quaternary center can weaken the mechanical properties of the polymers and may even result in fracture of the chain.

There is a particularly urgent need for polymeric complexes of heparin that can be fabricated by conventional coating, casting and molding techniques. The bonding of heparin to polymers constitutes one of the most promising approaches to the development of blood compatible materials.

Heparin is a mucopolysaccharide acid occuring in various animal tissues. Specifically, it is a glucuronic acid glucoside and is used medicinally in the form of a sodium salt. Heparin renders blood incoagulable, most probably by interfering with the formation of intrinsic thromboplastin and the action of thrombin.

Ionic complexes of heparin with linear ionenes have been found to gradually lose ionic bonded heparin during use with the resultant coagulation of lipid materials on the surface of the polymer in contact with blood.

SUMMARY OF THE INVENTION

In accordance with the invention a new class of elastomeric ionic block polymers have been synthesized. The novel polymers have the formula:

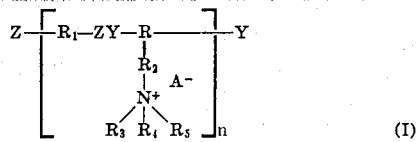

(I)

where R and $R_1$ are organic groups which may be of prepolymer length, $R_2$ is a short chain hydrocarbyl linking chain and $R_3$, $R_4$ and $R_5$ are hydrogen or the same or different lower aliphatic or aromatic groups. Z and Y are coreactive condensation groups, ZY is the residue of the condensation of Z and Y, $n$ is an integer greater than 2; preferably 10 to 1,000 or more, and $A^-$ is an anion, suitably halo.

The cationic viscoelastic polymer materials in accordance with the invention have an even distribution of residual negative charge throughout the polymer matrix, and a high concentration of intra- and intermolecular pseudo cross links. The flexible polymeric chains are capable of shielding positive charges and this prevents bond dissociation. Solvation of the pendant side chains containing the quaternary groups does not detrimentally affect the mechanical properties to the same extent as in linear polyurethanes. The pendant cationic groups are better exposed and are more avilable for ionic cross-linking with material such as dibromides. Furthermore, by utilizing polymerization conditions described below, the polymers are prepared in high molecular weight.

Cationic viscoelastic materials according to the invention will find many uses. The presence of cationic charge in the polymer will contribute conductivity to the product which can be further enhanced by complexing the cationic centers with charge-transfer complexing agents, such as TCNQ. Materials having conductivity within the semi-conductor range can be used in printed circuits and other electronic devices. Films of these materials would find application in forming charged master plates for graphic reproduction and ultimately for photo copying.

Conductive viscoelastic rubbers would likewise find application in electrostatic precipitation devices, dust collectors, corona-discharge shields, flocculation and the like. Furthermore, positive quaternary charges are usually associated with bacteriostatic, anti-parasitic and fungicidal activity. Therefore, surgical devices or articles such as tubing or gloves, formed of materials having these properties would be inherently germicidal as well as resistant to build up of static-electrical charges. In addition, by using well specified prepolymers, the polymerization product may be used in flocculation of impure water.

The block polymeric viscoelastic complexes with heparin, form a non-thrombogenic material that can be used to form the surfaces of prosthetic devices or articles in contac with blood. The block polymer can be used to coat the insides of tubes utilized in kidney dialysis machines or heart-lung machines or to coat the inside and outside of catheter surfaces to keep them free from clotting if present in a blood vessel for a long period of time. THe block polymeric non-thrombogenic material can also be used to impregnate Dacron, (polyester) sleeves used as artificial arteries.

These and many other attendant advantages of the invention will become apparent as the description becomes better understood by reference to the following detailed description when considered in conjunction with the accompanying drawings.

DESCRIPTION OF THE PREFERRED EMBODIMENTS

Figure 1:
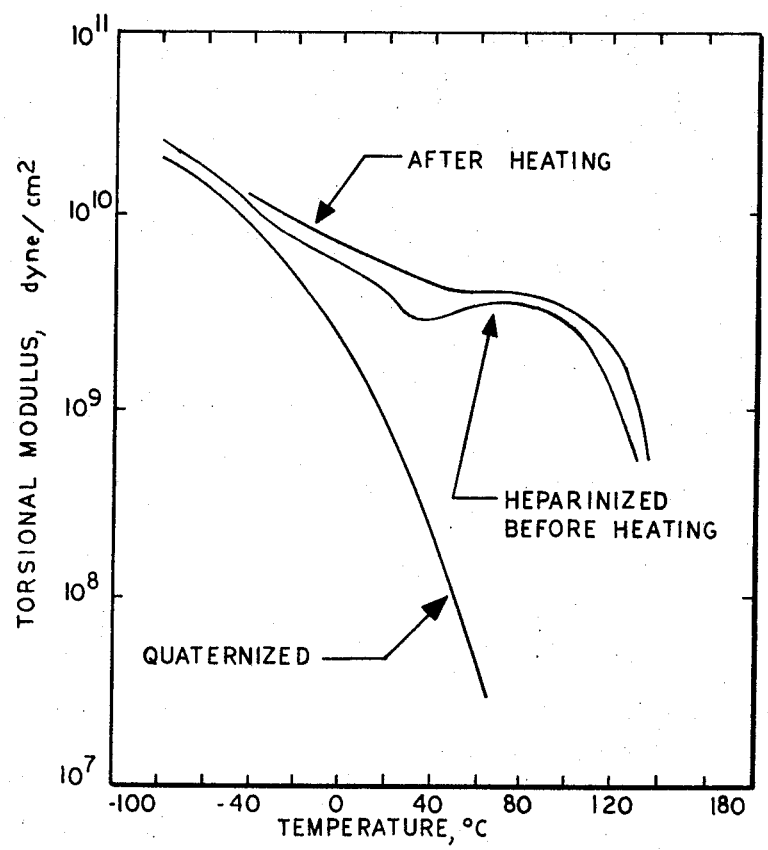
FIG. 1 is a graph of shear modulus versus temperature for the polyelectrolyte elastomers of Examples 2 and 12.

-Z general reaction synthesis according to the invention comprises reaction of a compound of the formula:

$$Z-R_1- \text{ (II) or } Z-R_1-Y \text{ (III)}$$

with a compound of the formula:

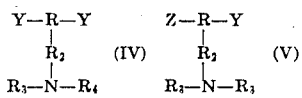

to form an intermediate non-charged or neutral polytertiary amino polymer of the formula:

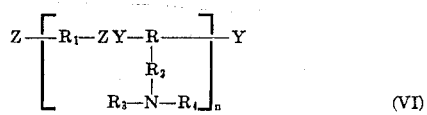

where R, $R_1$, $R_2$, $R_3$ and $R_4$ and $n$ have the above-defined meanings.

The polymer is then reacted with a quaternizing reagent of the formula:

$$R_5A$$

where A is an anion to form a polymer having the structure of Formula I.

The materials for the monomeric materials of Formula I and Formula II are preferably liquids of prepolymer length having a molecular weight above about 400 and below the range at which the prepolymer becomes excessively viscous or solid, suitably below 6,000 and preferably 1,000 to 3,000. The group R may be an aromatic or aliphatic hydrocarbon, either saturated or unsaturated or may be a polyether, polyester, silicone (e.g., a siloxane), polyamide, polyurethane or other type of prepolymer.

The Z and Y groups are selected from condensation coreactants generally utilized in forming condensation resins such as isocyanate-hydroxyl (urethane) isocyanate-amine (urea), hydroxyl-carboxyl (polyester) amino-carboxyl (amide) and the like. Urethane linking reactants are preferred due to the ready availability of diverse polyisocyanate materials, the absence of elimination products and the ready ability to select and control the properties of the final prepolymer.

Examples of suitable monomeric polyisocyanates include benzene-1,3-diisocyanate, hexane-1,6-diisocyanate, tolylene-2,4-diisocyanate (TDI), tolylene-2,3-diisocyanate, diphenylmethane-4,4'-diisocyanate, naphthalene 1,5-diisocyanate, diphenyl-3,3'-dimethyl 4,4'-diisocyanate, diphenyl-3,3'-dimethoxy-4,4'-diisocyanate diethyl ether, 3(diethylamino)-pentane-1,5-diisocyanate, butane-1,4-diisocyanate, cyclohex-4-ene-1,2-diisocyanate, benzene-1,3,4-triisocyanate, naphthalene-1,3,5,7-tetraisocyanate, naphthalene-1,3,7-triisocyanate, toluidine-diisocyanate, isocyanate terminated prepolymers, polyaryl polyisocyanates, and the like. A suitable commercially available polyaryl polyisocyanate is a polymethylene polyphenyl isocyanate known as PAPI-1 (The Carvin Co.). This material has an average of 3 isocyanate groups per molecule and an average molecular weight of about 380.

Other commercially available higher molecular weight liquid polyisocyanates are Adiprene L-100 (DuPont) an isocyanate terminated polybutylene oxide having a molecular weight of about 2,000, Adiprene L-167 (DuPont) an isocyanate terminated polybutylene oxide having a molecular weight of about 1,350. Multrathane-242F (Mobay) a polyester terminated with isocyanate groups and Solithane 113 (Thiokol) which is a triisocyanate derivative of glycerol and ricinoleic acid.

Terminally reactive liquid polymers such as hydroxy terminated polybutadienes containing 20 to 500 or more carbon atoms or Bis-phenol A terminated liquid polysiloxanes can be converted to diisocyanates by reaction with a diisocyanate such as hexa-methylene diisocyanate. As the carbon length of the prepolymer increases, elastomeric properties are favored.

The R group in the monomeric compounds of Formulas III and IV may also be aliphatic, aromatic or the various prepolymers discussed above. In the case of the use of a prepolymer diisocyanate the hydroxy amine material is suitably a compound of the formula:

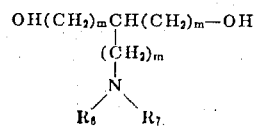

where $R_6$ and $R_7$ are lower alkyl, aryl such as phenyl, aralkyl such as benzyl or lower alkenyl, and $m$ is an integer from 0 to 5. Exemplary compounds are 3-dimethylamino-1,2,-propane diol, 4-diethylamino-1,3-butane diol, 6-dimethylamino-1,4-hexane diol.

In the quaternizing reagent $R_5A$, $R_5$ may be hydrogen, lower alkyl, aryl such as phenyl, aralkyl such as benzyl or alkenyl and A may be halo such as chloro, boromo or iodo, alkyl sulfate such as methylsulfate or alkyl iodide such as methyl iodide.

The polymerization reaction may be conducted in bulk or in the presence of a solvent for the monomers and polymer product such as benzene. The reaction may be conducted at room temperature or at elevated temperature up to or above the reflux temperature. The quaternization reaction is conducted in the presence of a solvent for the tertiary amino polymer and for the resulting quaternary salt such as tetrahydrofuran, acetone, dioxane, dimethylformamide, diaminoheptane, or mixtures thereof.

The following examples are presented solely for purposes of illustration. It is to be understood that many alternative and equivalent reactants and conditions may readily be substituted by those skilled in the art.

EXAMPLE 1

100 grams of Adiprene L167 (6.15 to 6.55% NCO) was reacted with 9.4 grams of vacuum distilled 3-dimethylamino-1,2-propane diol at 60° C for 24 hours. The reaction was followed by means of I.R. spectra. The disappearance of the OH peak at $\lambda = 3480$ cm$^{-1}$ as well as the NCO absorption peak at $\lambda = 2,280$ cm$^{-1}$ indicated completion of the reaction. After cooling to room temperature, the solid polymer was dissolved in benzene and precipitated with a tenfold volume of methanol. The purified polymer was dried in a vacuum oven overnight at 50° C.

The amount of diol utilized is calculated from the % NCO analysis as follows:

Grams diol = [(%NCO)(Wt. of NCO compd)(MW Diol)]/[(2)(MW NCO)]

where:

% NCO is the analyzed weight % content of isocyanate
MW Diol = 119 for this example
MW NCO = 42

EXAMPLE 2

100 grams of the product of Example 1 was dissolved in tetrahydrofuran (THF) to form a 10% solution. A concentrated solution of HCl (15 g of 37–38% HCl by weight) was added corresponding to a 100% stoichiometric excess. The solution was stirred at room temperature overnight before it was precipitated with a tenfold volume of n-hexane. It was then washed thoroughly with water to remove unreacted HCl. The quaternized polymer was dried in vacuum at 50° C overnight.

The quaternizing reagent, in this case HCl, is present in at least a 100% excess and preferably at least four times the stoichiometric amount is provided as follows:

Volume of HCl = [4 (Moles HCl (MW HCl)/[(Density HCl) (Wt% HCl)]

where moles of HCl is equal to the moles of diol.

EXAMPLE 3

100 grams of Adiprene L-100 (4.1% NCO) was reacted with 6 gms of 3-dimethylamino diol at 60° C for 24 hours in bulk in accordance with the procedure of Example 1 to form a polymer product.

EXAMPLE 3A

Example 3 was repeated in 10% benzene solution at reflux for 48 hours to form a polymer product. The solvent was removed by freeze drying.

EXAMPLE 4

The polymer product of Example 3 was quaternized in accordance with the procedure of Example 1 to form a quaternized polymer, (chloride counterion).

EXAMPLE 5

Dihydroxypolybutadiene (55g) of equivalent weight of 1,100 dissolved in benzene (150cc) was added to 1,6-hexamethylene diisocyanate (8.4g) in dry benzene (50cc) and heated to 70° C. The reaction was monitored by means of I.R. as described in Example 1. At the completions of the above reactions, freshly distilled 3-dimethylamino-1,2-propane diol (2.96g) was added to the mixture at room temperature and this reaction was completed within 24 hours. Methanol (1l) was then added to precipitate the product. The solvents were then decanted and the residual solvents were removed by vacuum evaporation. The thus prepared polymer was quaternized as described in Example 2.

EXAMPLE 6

3-dimethylamino-1,3-propane diol (295g) in dry benzene (15cc) was added to 1,6-hexamethylene diisocyanate (4.205g) in dry benzene (15cc) and left standing at room temperature for 3 days. Tetrahydrofuran (50ml) was first added to the reaction mixture followed by concentrated hydrochloric acid (5cc). After thorough mixing, the supernatant liquid was decanted, the residue was washed with THF (20cc) and dried in a vacuum oven. Yield of quaternized polymer — 6.5g.

The quaternized polymer (0.9g) dissolved in water (20cc) was added to an aqueous solution of sodium heparin (0.5g in 10cc of water) a precipitate of a heparin complex was immediately formed. The complex was stirred with acetone (three times), subsequently with water (three times). After filtration and drying a white crystalline product (1.2g) was obtained. The analysis of S showed approximately 44% of heparin in the complex.

EXAMPLE 7

720 gm. of Adiprene L-167 (DuPont-6.38% NCO) was reacted at reflux with 65.2 gm. (0.54 mole) of dimethylaminopropanediol in 3,000 ml benzene in a flask immersed in an oil bath. The reaction was carried out under a gentle flow of nitrogen. Reflux temperature was approximately 80° C while maintaining an oil bath temperature of 90°–110° C.

The extent of reaction is dependent on time of reaction and upon concentration of reactants. The extent of reaction was monitored by the NCO stretching frequency of the Infrared spectra. The absorption at $\lambda_{4.4}$ (NCO), $\lambda_{3.0}$ (OH) and $\lambda_{2.9}$ (NH) were monitored. The ratio $\lambda_{4.4}{:}\lambda_{2.9}$ should approach zero as the reaction of NCO proceeds. The results are presented in the following table.

TABLE 1

RATIO OF % ABSORPTION AT ABSORPTION WAVELENGTHS (MICRONS)

| TIME | $\lambda_{4.4}{:}\lambda_{3.0}$ | $\lambda_{4.4}{:}\lambda_{2.9}$ | STATE |
|---|---|---|---|
| 19 hr. | 0.33 | 0.50 | Viscosity increasing but flows easily. |
| 41 hr. | 0.36 | 0.24 | Viscosity still increasing. |
| 65 hr. | 0.22 | 0.17 | Very viscous. Heavy Foaming. |
| 65 hr. (quenched 2 hr. with dimethyl-aminoethanol) | 0.0 | 0.0 | |

The I.R. spectrum showed an absorption ratio of $\lambda_{4.4}{:}\lambda_{2.9}$ of 1.7. This corresponds to a peak molecular weight of 112,000 as later determined by Gel Permeation Chromatography (GPC) based on a polystyrene calibration curve.

At the end of the reaction period, the solvent was distilled directly from the oil bath (approximately 3 liters was collected). This procedure is suitable for lower molecular weight (MW) material. For higher MW materials, the extent of foaming is too great. In this case, the polymer is poured while still warm into a Teflon, (polytetrafluoroethylene) lined pan and air dried. Only a slight amount of bubbling in the polymer was noted at this time. N-Hexane was added to approximately the 4 liter mark. This insoluble mixture was stirred and decanted to remove lower MW material. The remaining polymer was dried using the same flask and oil bath with a vacuum pump and liquid N$_2$ trap. The polymer will "fluff" due to foaming.

EXAMPLE 8

Approximately 1,000 cc of Tetrahydrofuran was added to 200 gm of the "fluffed" polymer. Constant stirring was necessary to bring th polymer back into solution. 84.5 cc of HCl solution, (four times stoichiometric amount) was added slowly. The solution was cloudy initially, but further addition of HCl cleared the solution. Stirring was continued overnight. The quaternized polymer in THF was poured into 5 gal. of distilled water. This precipitation process was continued until all the polymer was collected. Drying was accomplished in a vacuum over with trap at room temperature.

% Cl 2.4%
GPC MW = 68,500

The volume ratio is preferably maintained below 10% to minimize the effect on MW. High MW polymer may not dissolve easily into THF, but will precipitate out without salting. Low MW polymer will dissolve easily into THF, but may have to be salted out from water.

The quaternized elastomeric polymer are further reacted according to this invention with anionic polymers or salts thereof such as polystyrene sulfonate, polyacrylates and the like and particularly with heparin or its alkali metal or ammonium salts to form viscoelastic ionically linked block polymeric salts.

The heparin content of the block polymer can be varied between 5% to about 20% by weight. Higher heparin content materials can be prepared. However, the latter have a lower degree of elasticity. Lower heparin content materials are soluble in common organic solvents while materials containing above 15% heparin are soluble in polar solvents such as THF, dimethylformamide (DMF), hexamethyl phosphoramide (Hexametapol) and especially mixtures thereof with 1-methyl-2-pyrrolidone. For the highest heparin content materials a small amount of about 0.01% to 5% of a primary or secondary amine such as heptylamine in DMF is necessary to achieve complete solubility.

The block polymer forms by ionic reaction of the quaternized elastomer, (chloride counterion), with sodium heparin with elimination of sodium chloride. Hence, the amount of chloride after reaction is very low. The reaction is conducted simply by combining the elastomer with sodium heparin preferably as separate solutions in solvent, suitably in 50:50 by volume mixtures of methanol and water.

In order to prevent clotting of blood, the ratio of heparin to polymer is preferably in excess of twice the amount necessary to satisfy the net normalized positive charge of the polymer. For example, the polymer of Example 8 has a normalized charge of 1 per 1,450 gm. Heparin has a net normalized negative charge of 1 per 143 gm. A minimum weight ratio of 2×143/1,450 or about 20% is necessary. An example prepared at a ratio of 25% follows.

EXAMPLE 9

130 gm of the quaternized polymer of Example 8 was dissolved in methanol (1,700cc). After the polymer dissolved, 1,700 cc of water was slowly added to form a 50:50 water-methanol mixture.

32.5 gm of sodium heparin was dissolved in 400 cc of water. Another 400 cc of methanol was slowly added to make a 50:50 water-methanol mixture.

The heparin solution (conc.~4%) was added to the polymer solution (conc.~4%) after filtration of both solutions. The mixtures were added quickly and totally with constant vigorous stirring. The weight ratio of heparin to polymer was 25%.

The resulting precipitate was collected, washed with water and vacuum dried at room temperature. A portion remained in solution and was salted out with 1,000 ml of a 10% $Na_2Cl$ solution.

A film pressed from this material and exposed to plasma did not cause clotting. The ratio was reduced to 10% heparin which would leave no negative charges available. A film pressed from the latter material clotted plasma in a normal time period.

EXAMPLE 10

The quaternized L167 polymer (40 gm) of Example 2 was dissolved in methanol (500 cc). Distilled water (500 cc) was added to the mixture slowly with stirring. The solution remained homogeneous. (solution 1). Sodium heparin (8 gm) was dissolved in distilled water (200 cc). Slow addition of methanol (200 cc) followed with stirring. A homogenous solution of heparin was obtained (Solution 2). Solution 2 was added to Solution 1 to yield a block copolymer of low heparin content.

EXAMPLE 11

Addition of Solution 1 to Solution 2 yielded a block copolymer of much higher heparin content.

EXAMPLE 12

8 gm of Solution 2 of heparin was added to a Solution 1 of quaternized L-100 polymer (40 gm) of Example 4 to form a low heparin content copolymer.

EXAMPLE 13

The reverse order of addition was followed and a heparin block copolymer of higher heparin content resulted.

The results of quantitative determination of chloride and heparin content of the Adiprene series of copolymers as well as the solubility of the elastomers before and after reaction are recorded in Table 2.

TABLE 2. CHEMICAL ANALYSIS AND SOLUBILITY

| Example | Material | Percent Cl Theor. | Percent Cl Exp. | Percent S | Percent Heparin | Solubility | Anion[1] to cation ratio |
|---|---|---|---|---|---|---|---|
| 1 | Neutral | | | | | Benzene, THF, etc | |
| 2 | Quaternized | 2.40 | 2.40 | | 0 | $CH_3OH$, $CH_3OH/H_2O$, THF | |
| 11 | Heparinized | 0.0 | 0.50 | 1.58 | 15.8 | Hexametapol, methyl pyrrolidone | 1.50 |
| 10 | do | 0.0 | 0.16 | 1.49 | 10.4 | DMF, hexametapol, etc | 1.42 |
| 5 | Neutral | | | | | Benzene, THF, etc | |
| 7 | Quaternized | 1.8 | 1.8 | 0 | 0 | $CH_3OH$, $CH_3OH/H_2O$, THF | |
| 13 | Heparinized | 0.0 | 0.3 | 1.04 | 10.4 | Hexametapol | |
| 12 | do | 0.0 | 0.2 | 0.72 | 7.2 | DMF, hexametapol, THF/DMF | 1.16 |

[1] $\dfrac{\text{Anion}}{\text{Cation}} = \text{wt. percent heparin} \times \dfrac{\text{unit segment wt. percent quaternized polymer}}{\text{unit segment wt. percent heparin (tetrasaccharide)}} \times \dfrac{\text{No. of anions per unit segment of heparin}}{\text{No. of cations per unit segment of quatern. polymer}}$ The formation of the ionic bonds results in the elimination of sodium chloride and the amount of residual chlorine is very low. As expected, the heparin block copolymers are completely insoluble in methanol, but may be dissolved in the other listed solvents. Normally, heparin complexes have a very limited solubility. The solvent system of DMF and primary or secondary amines constitute a special claim.

The GPC molecular distribution profile indicates that the neutral polymer did not undergo any side reaction during quaternization. The molecular weight of the THF soluble heparin block copolymer is about 58,000. Since this molecular weight is about twice that of the neutral polymer, it is further evidence of the ionic bonding in the complex.

Figure 2:
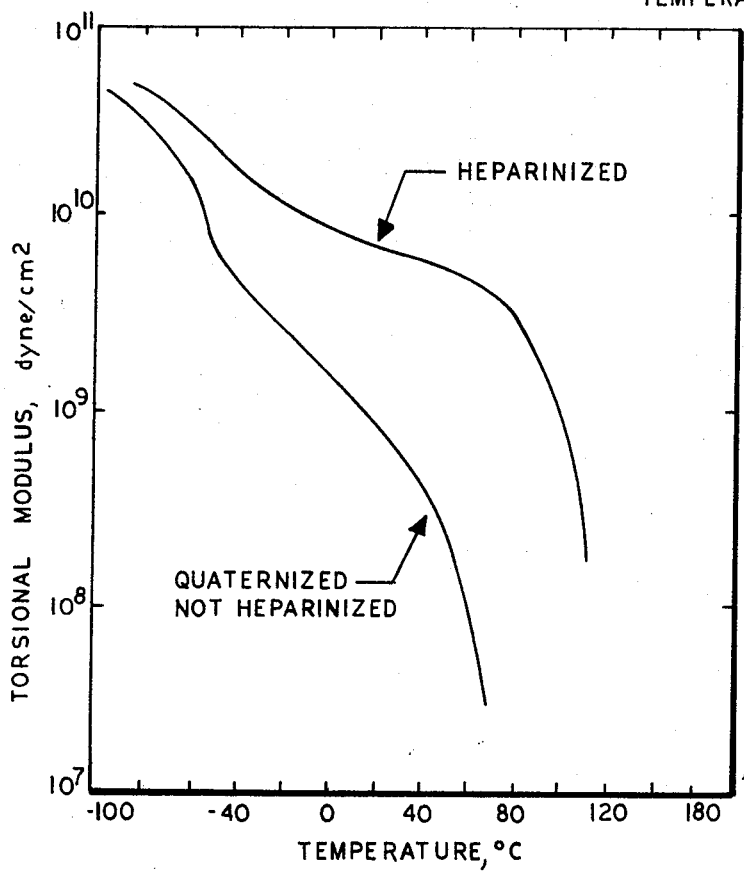
FIG. 2 is a graph of shear modulus versus temperature for the polyelectrolyte elastomer of Examples 4 and 13.

The ten second shear modulus versus temperature curves (FIGS. 1 and 2) determined by means of a Gehman apparatus show a dramatic increase in modulus of two heparin complexes as compared with the non-heparinized materials. The higher modulus in the temperature range of −100 to 140° C (FIG. 1) as well as the slope of the curve is attributed to pseudo crosslinks formed between the negative charges of heparin and positive charges on the polymer. This type of crosslinking preserves moldability under pressure in contrast to convalently crosslinked rubbers. FIG. 1 shows that additional reaction is taking place on heating the complex to a temperature of 60° C. This is probably due to further reaction of unreacted anionic groups of the heparin nolecules with the residual chloride of the quaternized polymer and is consistent with the chloride analysis (0.5 wt.%), (See Table 2).

The tensile strength and elongation at break of neutral, quaternized and heparinized polymers is shown on Table 3 below. The increase in tensile strength on reaction with heparin (Table 3), is consistent with the data obtained from the determination of the shear modulus as a function of temperature (FIGS. 1 and 2) on two heparinized elastomers which differ only in molecular weight of unit segment, (Mn). The heparinization raises the modulus and this is certainly due to the occurrence of crosslinking. The latter is also responsible for the dramatic improvement in tensile strength. The degree of crosslinking is also reflected in the anion to cation ratio. The smaller the ratio, the higher the tensile strength (Table 3) as expected. AAs the molecular weight of unit segment increases, the number of positive charges decreases; therefore, the elongation at break is expected to be higher and this is also born out by the data of Table 3.

The nature of the cross-links which are due to an ionic bond between the negative groups on the heparin molecule and the positive nitrogen on the quaternary polymer permits molding under pressure and solubility

TABLE 3.—MECHANICAL PROPERTIES

| Sample | Method | Tensile strength (T.S.), p.s.i. | Percent Elongation | S | Remarks | Anion to cation ratio |
|---|---|---|---|---|---|---|
| Example 4 | Quaternized without heparin ($M_n=2,000$) | 862 | 2,175 | | Low concentration of $N^+$ | |
| Example 12 | Addition of heparin to polymer ($M_n=2,000$) | 6,618 | | | Increased T.S. due to crosslinking | |
| Example 13 | Addition of polymer to heparin ($M_n=2,000$) | 9,515 | 1,112 | 0.72 | High concentration of crosslinks | 1.16 |
| Example 2 | Quaternized without heparin ($M_n=1,350$) | 3,054 | 1,565 | | High concentration of $N^+$ | |
| Example 11 | Addition of polymer to heparin ($M_n=1,350$) | 8,681 | 232 | 1.58 | Reduced concentration of crosslinks | 1.50 | in polar organic solvents. This would of course not be true for covalently cross-linked polymers. The block copolymer can be molded or extruded to form tubes or other shaped articles.

Films or membranes can be formed by casting a solution of the copolymer and evaporating the solvent. The surfaces of membranes, tubes, catheters, valves, prosthetic veins, etc., can be coated with solutions of the copolymer and the solvent removed, suitably by vacuum drying to deposit a non-thrombogenic coating. The copolymer is compatible with numerous substrates such as Tygon (polyvinyl) Teflon (polytetrafluoroethylene), Dacron (polyester), silicone resins, glass, polystyrene, and polyurethane.

EXAMPLE 14

Polyester type polyurethane tubing (1/8 inch and 1/4 inch I·D) were coated by means of a 5% DMF heparin complex solution (16% heparin content). The surface of the coating and the longitudinal cross section were examined by means of an electron scanning microscope. The micrographs showed good surface homogeneity and yields a value of $28\mu$ for the coating thickness.

A smooth coating is also obtained from the quaternized polymer without heparin. However, it is interesting to note that by coating the surface with the quaternized polymer and reacting subsequently with an aqueous solution of heparin, a coat is obtained with numerous holes. This is also true if a methanol-water heparin solution is used instead or pure water. The hole formation may be due to contraction of the matrix when crosslinking is accompanied with the elimination of sodium chloride. This problem could be eliminated by successive applications of heparin solution, quaternary polymer solution and then a further application of the heparin solution.

Lee White clotting tests were conducted with whole blood in the coated tubing of Example 14 for various time periods. The tubing was washed with water after each period. The blood samples removed from the tubing after each period clotted normally in glass container within 10 to 20 minutes. The results follow in Tables 4 and 5.

TABLE 4

IN VITRO BLOOD CLOTTING TESTS (AFTER 16 HOURS WATER WASH)

| Time in ¼ inch ID tube Hours | Clotting time in glass Minutes |
|---|---|
| 4 (1st Cycle) | No clot |
| 4.5 (2nd Cycle) | 19 |
| 4 (3rd Cycle) | 19 |
| 24 (1st Cycle) | 10 |

TABLE 5

IN VITRO BLOOD CLOTTING TESTS (AFTER 24 HOURS WATER WASH)

| Time in ¼ inch ID tube Hours | Clotting time in glass Minutes |
|---|---|
| 4 (1st Cycle) | 7 |
| 4 (2nd Cycle) | 7 |
| 24 (1st Cycle) | 6 |

No heparin could be detected by means of the Azure A dye in aqueous extracts of the heparinized copolymers. THe positive charges in the copolymers are evidently shielded by the flexible polymer chains since blood is not coagulated. This shielding may also contribute to the high retention of heparin. The values of tensile strength, elongation at break and shear modulus as a function of temperature show that the heparinized complexes have good mechanical properties under ambient conditions. The solubility of high heparin content complexes in polar organic solvents offers important advantages for fabrication applications. Molded films of heparin complexes gain up to 30% in weight when immersed in aqueous media for 24 hours. This indicates good permeability. The latter is also responsible for opaqueness of coatings in prolonged contact with water.

It is to be understood that only preferred embodiments of the invention have been described and that numerous substitutions, modifications and alterations are all permissible without departing from the spirit and scope of the invention as defined in the following claims.

What is claimed is:

1. An ionic block elastomer of the formula:

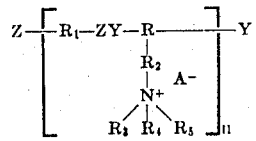

where R is lower alkylene, $R_2$ is lower alkylene, $R_3$, $R_4$ and $R_5$ are selected from hydrogen and lower alkyl, $R_1$ is a liquid prepolymer having a molecular weight from 1,000 to 3,000 selected from the class consisting of polyether, polyester, silicone, polyurethane, and polyamide;

Z and Y are selected from hydroxyl and isocyanate groups, ZY is the urethane residue of the condensation of Z and Y, $n$ is an integer from 10 to 1000; and $A^-$ is heparin and the elastomer contains between 5 and 20% of weight of heparin forming a high concentration of inter- and intra-molecular ionic cross links between quaternary nitrogen atoms pendant from the prepolymer chain.

2. An elastomer according to claim 1 in which the heparin content is between 10 and 15%, and the elastomer is dissolved in a solvent selected from the group consisting of polar solvents and mixtures thereof with an alkyl amine.

3. An elastomer according to claim 2 in which said solvent is selected from dioxane, acetone, tetrahydrofuran, dimethylformamide and mixtures thereof with 0.01 to 5% of a primary or secondary alkylamine.

4. An elastomer according to claim 3 in which the solvent is a mixture of dimethylformamide and diaminoheptane.

5. A method of rendering a surface nonthrombogenic comprising covering said surface with a film comprising the elastomer of claim 1.

6. A method according to claim 5 in which said surface is prepared by molding a shaped article from said elastomer.

7. A method according to claim 5 in which said surface is formed by casting a film of said elastomer.

8. A method according to claim 5 in which said surface is formed by coating a substrate with a solution according to claim 2 and evaporating the solvent therefrom.

9. An article of manufacture comprising a film of the ionic block elastomer as defined in claim 1.

10. An article according to claim 9 in which the film is supported on a substrate.

11. An article according to claim 10 in which the substrate is selected from the group consisting of polyvinyl, polytetrafluoroethylene, polyester, silicone resins, glass, polystyrene and polyurethane.

12. An article according to claim 9 in which said film is in tubular shape.

* * * * *